United States Patent
Tezuka et al.

(10) Patent No.: US 10,577,272 B2
(45) Date of Patent: Mar. 3, 2020

(54) METHOD OF PRODUCING LTP OR LATP CRYSTAL PARTICLE

(71) Applicant: Sumita Optical Glass, Inc., Saitama-shi, Saitama (JP)

(72) Inventors: Tatsuya Tezuka, Saitama (JP); Dai Anzai, Saitama (JP)

(73) Assignee: Sumita Optical Glass, Inc., Saitama-shi, Saitama (JP)

( * ) Notice: Subject to any disclaimer, the term of this patent is extended or adjusted under 35 U.S.C. 154(b) by 9 days.

(21) Appl. No.: 15/523,470

(22) PCT Filed: May 10, 2016

(86) PCT No.: PCT/JP2016/002299
§ 371 (c)(1),
(2) Date: May 1, 2017

(87) PCT Pub. No.: WO2017/195232
PCT Pub. Date: Nov. 16, 2017

(65) Prior Publication Data
US 2018/0105450 A1 Apr. 19, 2018

(51) Int. Cl.
*C03B 32/02* (2006.01)
*H01M 10/0562* (2010.01)
(Continued)

(52) U.S. Cl.
CPC .............. *C03B 32/02* (2013.01); *C03C 3/21* (2013.01); *C03C 4/14* (2013.01); *C03C 10/00* (2013.01);
(Continued)

(58) Field of Classification Search
CPC ........... C03C 3/21; C03C 10/00; C03B 32/02; H01M 10/0562; H01M 2300/0074
See application file for complete search history.

(56) References Cited

U.S. PATENT DOCUMENTS 4,820,660 A * 4/1989 Mohri ................ A61L 27/12
501/10
4,874,724 A * 10/1989 Beall ................... C03C 10/00
501/10

(Continued)

FOREIGN PATENT DOCUMENTS

JP    H05139781 A    6/1993
JP    2656415 B2     9/1997
(Continued)

OTHER PUBLICATIONS

Machine Translation of JP 5-139781 (Feb. 1, 2019) pp. 1-4.*
(Continued)

*Primary Examiner* — John M Hoffmann
(74) *Attorney, Agent, or Firm* — Kenja IP Law PC

(57) ABSTRACT

The present disclosure is to provide a method of producing a LTP or LATP crystal particle that has reduced impurity contamination, high crystallinity, and excellent dispersibility. The method of producing a LTP or LATP crystal particle according to the present disclosure includes: preparing glass containing, in molar ratio, $1+x$ of $Li_2O$, where $0 \leq x \leq 1$, $x$ of $Al_2O_3$, $4-2x$ of $TiO_2$, $3+y$ of $P_2O_5$, where $1 \leq y \leq 4$, and from more than $y$ to less than $3y$ of ZnO; subjecting, after the preparation of glass, the glass to thermal treatment for crystallization; and selectively eluting a substance other than a LTP or LATP crystal through acid treatment.

3 Claims, 24 Drawing Sheets

(51) Int. Cl.
*C03C 3/21* (2006.01)
*C03C 15/00* (2006.01)
*H01M 10/052* (2010.01)
*C03C 4/14* (2006.01)
*C03C 10/00* (2006.01)

(52) U.S. Cl.
CPC .......... *C03C 15/00* (2013.01); *H01M 10/052* (2013.01); *H01M 10/0562* (2013.01); *C03C 2204/00* (2013.01); *H01M 2300/0068* (2013.01)

(56) References Cited

U.S. PATENT DOCUMENTS

| | | | | |
|---|---|---|---|---|
| 5,122,254 | A | * | 6/1992 | Ammende ........... G01N 27/333 204/419 |
| 7,211,532 | B2 | * | 5/2007 | Fu ............................ C03C 4/18 204/429 |
| 7,435,695 | B2 | * | 10/2008 | Hormadaly ............... C03C 3/16 501/20 |
| 2002/0137620 | A1 | * | 9/2002 | Quinn ..................... C03C 3/062 501/45 |
| 2013/0137010 | A1 | * | 5/2013 | Aitken ............. H01M 10/0525 429/486 |
| 2014/0084503 | A1 | * | 3/2014 | Badding ................ B82Y 30/00 264/6 |
| 2014/0376868 | A1 | * | 12/2014 | Ritter .................... C03C 13/046 385/123 |

FOREIGN PATENT DOCUMENTS

| | | |
|---|---|---|
| JP | 2011241138 A | 12/2011 |
| JP | 2013199386 A | 10/2013 |
| JP | 2013237578 A | 11/2013 |
| JP | 2014094879 A | 5/2014 |
| KR | 1020100035417 A | 4/2010 |

OTHER PUBLICATIONS

Nov. 13, 2018, International Preliminary Report on Patentability issued in the International Patent Application No. PCT/JP2016/002299.

Jun. 21, 2016, International Search Report issued in the International Patent Application No. PCT/JP2016/002299.

Jul. 11, 2018, Office Action issued by the Korean Intellectual Property Office in the corresponding Korean Patent Application No. 10-2017-7012949.

Sep. 3, 2019, Office Action issued by the China National Intellectual Property Administration in the corresponding Chinese Patent Application No. 201680003303.6.

* cited by examiner

METHOD OF PRODUCING LTP OR LATP CRYSTAL PARTICLE

TECHNICAL FIELD

The present disclosure relates to a method of producing a LTP or LATP crystal particle that has reduced impurity contamination, high crystallinity, and excellent dispersibility.

BACKGROUND

A lithium-based composite oxide crystal with a nasicon-type crystal structure shows promise as a solid electrolyte material of a lithium ion battery due to its chemical stability and high lithium ion conductivity at room temperature. To achieve high battery performance, impurity reduction, high crystallization, and microparticulation are required for the solid electrolyte material.

In this regard, a lithium-based composite oxide crystal represented by Formula (I)

$$Li_{1+x}Al_xTi_{2-x}(PO_4)_3 (0 \leq x \leq 1.0) \quad (I)$$

(hereinafter, the above crystal is called the "LTP or LATP crystal", where, when x=0 in the above Formula (I), the crystal is an LTP crystal, and when 0<x≤1.0 in the above Formula (I), the crystal is a LATP crystal) has chemical stability and high lithium ion conductivity, which are required for the solid electrolyte material, and is free of a rare element and relatively easy to produce. Accordingly, the LTP or LATP crystal, among other lithium-based composite oxide crystals, holds great promise as the aforementioned solid electrolyte material. Thus, impurity reduction, high crystallization, and microparticulation are strongly desired especially for the LTP or LATP crystal.

At present, the solid-phase method, sol-gel method, and vitrification method are generally used as a method of producing the LTP or LATP crystal, and any of these methods involves milling for microparticulation. Milling might pose problems, such as impurity contamination and strain occurring in the crystal structure, which might be a cause of a decrease in lithium ion conductivity. Furthermore, since a high-level milling technique is required for sharpening particle size distribution, a microparticulation technique which does not involve milling is sought for.

Therefore, there has been proposed a method of producing a porous body of LTP or LATP crystals, the method including vitrification of a plurality of oxides, as materials of the LTP or LATP crystals, together with $Ca_3(PO_4)_2$, followed by thermal treatment and acid treatment of glass resulting from the vitrification (refer to Patent Literature 1).

CITATION LIST

Patent Literature

PTL 1: Japanese Patent No. 2656415

SUMMARY

Technical Problem

However, the porous body of the LTP or LATP crystals produced by the production method described in Patent Literature 1 contains a large amount of Ca as an impurity, has low crystallinity, and moreover, requires milling to obtain crystal particles with excellent dispersibility.

The present disclosure has been conceived in view of the above respect, and the present disclosure is to provide a method of producing a LTP or LATP crystal particle that has reduced impurity contamination, high crystallinity, and excellent dispersibility.

Solution to Problem

The present inventors have conducted earnest studies on the above problem and found that a LTP or LATP crystal particle that has reduced impurity contamination, high crystallinity, and excellent dispersibility is obtained without the need for milling, by forming glass containing, in molar ratio, 1+x of $Li_2O$, x of $Al_2O_3$, 4−2 of $TiO_2$ (0≤x≤1), 3+y of $P_2O_5$, and from more than y to less than 3y of ZnO (1≤y≤4), and, after that, by subjecting the glass to thermal treatment for crystallization, and by selectively eluting a substance other than a LTP or LATP crystal through acid treatment. Thus, the present inventors have completed the present disclosure.

That is to say, some of modes for solving the above problem are as follows.

1. A method of producing a LTP or LATP crystal particle, the method including:
   preparing glass containing,
   in molar ratio,
   1+x of $Li_2O$, where 0≤x≤1,
   x of $Al_2O_3$,
   4−2x of $TiO_2$,
   3+y of $P_2O_5$, where 1≤y≤4, and
   from more than y to less than 3y of ZnO;
   subjecting, after the preparation of glass, the glass to thermal treatment for crystallization; and
   selectively eluting a substance other than a LTP or LATP crystal through acid treatment.

2. The method of producing according to 1, wherein the molar ratio of ZnO, in materials of the glass, ranges from more than y to 2y or less.

Advantageous Effect

The present disclosure makes it possible to produce a LTP or LATP crystal particle that has reduced impurity contamination, high crystallinity, and excellent dispersibility.

DETAILED DESCRIPTION

Figure 1:
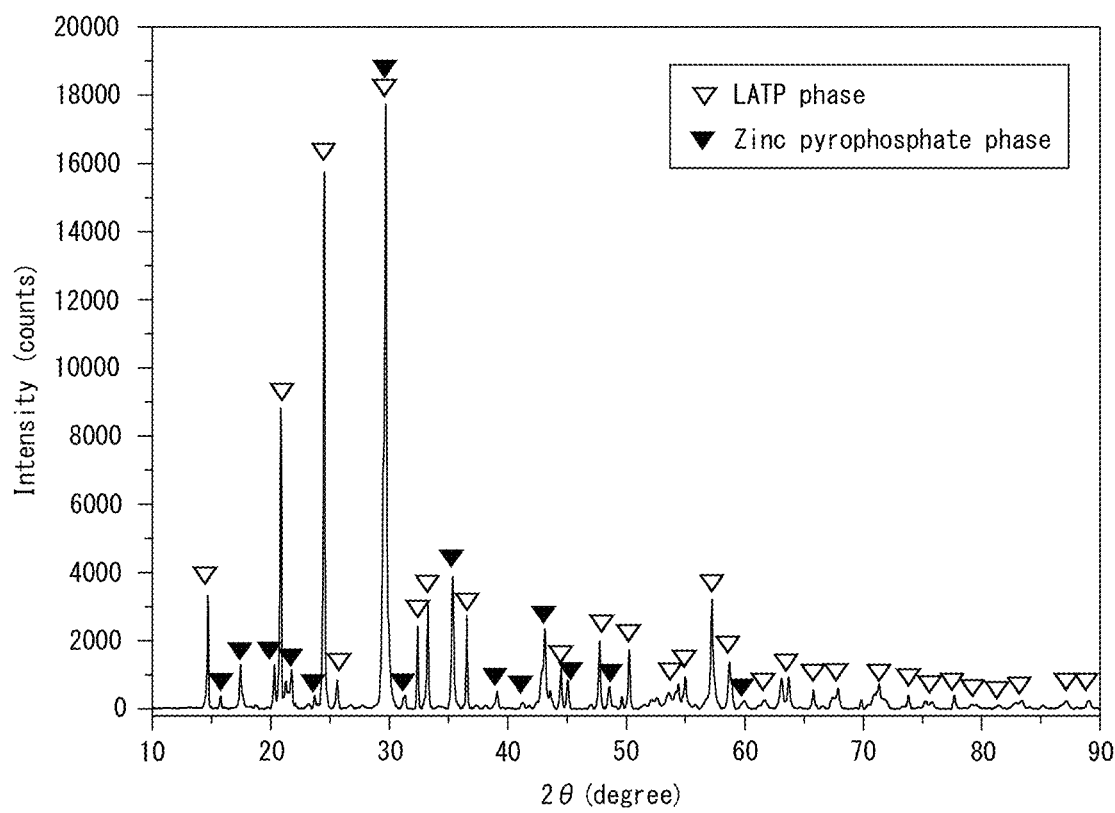
FIG. 1 illustrates an X-ray diffraction pattern of crystallized glass in a process of preparing a LATP crystal particle of Example 1.

A description is given in detail below of a method of producing a LTP or LATP crystal particle according to one of embodiments of the present disclosure.

The method of producing a LTP or LATP crystal particle according to the present embodiment uses respective materials, such as oxide, hydroxide, carbonate, nitrate, and phosphate, that, when vitrified, correspond to components given as $Li_2O$, $Al_2O_3$, $TiO_2$, $P_2O_5$, and ZnO.

<$Li_2O$>

$Li_2O$ is a component that constitutes a LTP or LATP crystal, and the molar ratio of $Li_2O$, when vitrified, is 1+x. Due to the relation with $Al_2O_3$ and $TiO_2$, x ranges from 0 to 1 inclusive. When x is more than 1, the LATP crystal structure may collapse. Preferably, x is 0.8 or less. More preferably, x is 0.6 or less. As materials of the $Li_2O$ component, phosphate, such as $LiPO_3$, and carbonate, such as $Li_2CO_3$, are used, for example.

<$Al_2O_3$>

$Al_2O_3$ is a component that constitutes a LATP crystal, and the molar ratio of $Al_2O_3$, when vitrified, is x. As materials of the $Al_2O_3$ component, phosphate, such as $Al(PO_3)_3$, and hydroxide, such as $Al(OH)_3$, are used, for example.

<$TiO_2$>

$TiO_2$ is a component that constitutes a LTP or LATP crystal, and the molar ratio of $TiO_2$, when vitrified, is 4−2x. As materials of the $TiO_2$ component, phosphate, such as $TiP_2O_7$, and oxide, such as $TiO_2$, are used, for example.

<$P_2O_5$>

$P_2O_5$ is a component that constitutes a LTP or LATP crystal and that also constitutes zinc pyrophosphate, which is precipitated during thermal treatment performed after vitrification. The molar ratio of $P_2O_5$, when vitrified, is 3+y. Due to the relation with $Li_2O$, $Al_2O_3$, and $TiO_2$, y ranges from 1 to 4 inclusive. When y is less than 1, vitrification is difficult. When y is more than 4, glass loses stability, and precipitation of a crystal through thermal treatment, performed after vitrification, is difficult. Preferably, y ranges from 1.5 to 3.5 inclusive. More preferably, y ranges from 2 to 3 inclusive. As materials of the $P_2O_5$ component, the aforementioned phosphate, acid, such as $H_3PO_4$, and oxide, such as $P_2O_5$, are used, for example.

<ZnO>

ZnO is a component that constitutes zinc pyrophosphate, which is precipitated during thermal treatment performed after vitrification, and the molar ratio of ZnO, when vitrified, ranges from more than y to less than 3y. When the molar ratio of ZnO is y or less, in addition to a LTP or LATP crystal, a titanium pyrophosphate crystal, which is not eluted by acid, may be precipitated during thermal treatment performed after vitrification. When the molar ratio of ZnO is 3y or more, although a zinc phosphate crystal and a zinc pyrophosphate crystal, which may be eluted by acid, are precipitated during thermal treatment performed after vitrification, Zn may be partially introduced into a LTP or LATP crystal and remain as an impurity. Preferably, the molar ratio of ZnO ranges from more than y to 2y or less. By setting the molar ratio of ZnO to be 2y or less, a sub-phase other than a zinc pyrophosphate crystal is reduced at the stage of crystallized glass, and impurities are less likely to remain in a LTP or LATP crystal particle. As materials of the ZnO component, phosphate, such as $Zn(PO_3)_2$, and oxide, such as ZnO, are used, for example.

<Preparation of Glass>

As glass materials, oxide, hydroxide, carbonate, nitrate, phosphate, or the like, which are the materials corresponding to the components, are weighed according to predetermined percentages and mixed fully. Subsequently, the mixed materials are introduced into, for example, a platinum crucible that is not reactive the glass materials and others, are stirred timely while melt by heating the materials to from 1200 to 1500° C. in an electric furnace, and after that, are clarified and homogenized in the electric furnace. Then, the melt is poured into a tank filled with sufficient water and granulated and rapidly cooled. Thus, glass is prepared.

<Thermal Treatment>

Subsequently, the prepared glass is subject to thermal treatment in two steps each conducted for from 10 to 30 hours, with first step at from 400 to 600° C. and the second step at from 700 to 900° C. The thermal treatment is conducted to obtain crystallized glass inside which a LTP or LATP crystal particle and mainly a zinc pyrophosphate crystal as an eluted phase are precipitated, and after acid treatment which is described below, a LTP or LATP crystal particle having a diameter of from 0.1 to 10 μm is obtained.

<Acid Treatment>

Furthermore, the obtained crystallized glass is subject to acid treatment by immersing the crystallized glass in 1 to 5N nitric acid or 1 to 5N hydrochloric acid at from 30 to 90° C. for 3 to 24 hours. During the immersion, stirring with a stirrer or the like is preferably conducted. By the acid treatment, an eluted phase, other than a LTP or LATP crystal, that is mainly composed of a zinc pyrophosphate crystal is eluted. After the acid treatment, a LTP or LATP crystal is separated from an acid solution with use of a filter paper or the like, and thus, a LTP or LATP crystal particle having a diameter of from 0.1 to 10 μm is obtained.

According to the method of manufacturing a LTP or LATP crystal particle of the present embodiment configured as above, since mainly the zinc pyrophosphate crystal is precipitated as the eluted phase at the time of vitrification, solubility of the eluted phase with respect to acid is higher than before, and this prevents residual components to be eluted in the acid treatment. Accordingly, impurity contamination is reduced, and manufacturing of a LTP or LATP crystal particle having high crystallinity and excellent dispersibility is allowed.

Furthermore, according to the method of manufacturing a LTP or LATP crystal particle of the present embodiment, when the molar ratio of ZnO in the glass materials ranges from more than y to 2y or less, impurities are even less likely to remain in a LTP or LATP crystal particle.

EXAMPLES

A description is given below of a method of manufacturing a LTP or LATP crystal particle according to the present disclosure with reference to Examples and Comparative Examples. However, the present disclosure is not limited to these Examples.

Example 1

By using $LiPO_3$, $Al(PO_3)_3$, $Zn(PO_3)_2$, $TiO_2$, and ZnO as materials, glass composed, in molar ratio, of 1.2 of $Li_2O$, 0.2 of $Al_2O_3$, 3.6 of $TiO_2$, 6 of $P_2O_5$, and 6 of ZnO was prepared. That is to say, glass according to the above embodiment in which x=0.2, y=3, and ZnO was 2y in molar ratio was prepared. Subsequently, the prepared glass was subject to thermal treatment in two steps, the first step at 520° C. for 20 hours and the second step at 850° C. for 20 hours, and thus, crystallized glass was obtained. The crystallized glass was subject to acid treatment by immersing the crystallized glass in 5N nitric acid at 60° C. for 12 hours, and subsequently, particles were collected by filtering to obtain LATP crystal particles of Example 1.

Example 2

By using $LiPO_3$, $Al(PO_3)_3$, $Zn(PO_3)_2$, $TiO_2$, and ZnO as materials, glass composed, in molar ratio, of 1.3 of $Li_2O$, 0.3 of $Al_2O_3$, 3.4 of $TiO_2$, 5 of $P_2O_5$, and 4 of ZnO was prepared. That is to say, glass according to the above embodiment in which x=0.3, y=2, and ZnO was 2y in molar ratio was prepared. Subsequently, the prepared glass was subject to thermal treatment in two steps, the first step at 480° C. for 20 hours and the second step at 820° C. for 20 hours, and thus, crystallized glass was obtained. The crystallized glass was subject to acid treatment by immersing the crystallized glass in 3N hydrochloric acid at 60° C. for 12 hours, and subsequently, particles were collected by filtering to obtain LATP crystal particles of Example 2.

Example 3

By using $LiPO_3$, $Al(PO_3)_3$, $Zn(PO_3)_2$, $TiO_2$, and ZnO as materials, glass composed, in molar ratio, of 1.4 of $Li_2O$, 0.4 of $Al_2O_3$, 3.2 of $TiO_2$, 6 of $P_2O_5$, and 7 of ZnO was prepared. That is to say, glass according to the above embodiment in which x=0.4, y=3, and ZnO was 2.3y in molar ratio was prepared. Subsequently, the prepared glass was subject to thermal treatment in two steps, the first step at 470° C. for 20 hours and the second step at 790° C. for 20 hours, and thus, crystallized glass was obtained. The crystallized glass was subject to acid treatment by immersing the crystallized glass in 3N hydrochloric acid at 60° C. for 12 hours, and subsequently, particles were collected by filtering to obtain LATP crystal particles of Example 3.

Comparative Example 1

By using $LiPO_3$, $Al(PO_3)_3$, $Ca(PO_3)_2$, $TiO_2$, and $CaCO_3$ as materials, glass composed, in molar ratio, of 1.3 of $Li_2O$, 0.3 of $Al_2O_3$, 3.4 of $TiO_2$, 5.2 of $P_2O_5$, and 6.6 of CaO was prepared. Subsequently, the prepared glass was subject to thermal treatment in two steps, the first step at 580° C. for 20 hours and the second step at 700° C. for 12 hours, and thus, crystallized glass was obtained. The crystallized glass was subject to acid treatment by immersing the crystallized glass in 5N nitric acid at 60° C. for 12 hours, and subsequently, filtering was conducted to obtain a porous body. The obtained porous body was milled in a ball mill for 12 hours, and LATP crystal particles of Comparative Example 1 were obtained.

Comparative Example 2

By using $LiPO_3$, $Al(PO_3)_3$, $Zn(PO_3)_2$, $TiO_2$, and ZnO as materials, glass composed, in molar ratio, of 1.4 of $Li_2O$, 0.4 of $Al_2O_3$, 3.2 of $TiO_2$, 6 of $P_2O_5$, and 9 of ZnO was prepared. That is to say, glass according to the above embodiment in which x=0.4, y=3, and ZnO was 3y in molar ratio was prepared. Subsequently, the prepared glass was subject to thermal treatment in two steps, the first step at 460° C. for 20 hours and the second step at 810° C. for 20 hours, and thus, crystallized glass was obtained. The crystallized glass was subject to acid treatment by immersing the crystallized glass in 5N nitric acid at 60° C. for 12 hours, and subsequently, particles were collected by filtering to obtain LATP crystal particles of Comparative Example 2.

Comparative Example 3

By using $LiPO_3$, $Al(PO_3)_3$, $Zn(PO_3)_2$, $TiP_2O_7$, and $TiO_2$ as materials, glass composed, in molar ratio, of 1.4 of $Li_2O$, 0.4 of $Al_2O_3$, 3.2 of $TiO_2$, 6 of $P_2O_5$, and 3 of ZnO was prepared. That is to say, glass according to the above embodiment in which x=0.4, y=3, and ZnO was y in molar ratio was prepared. Subsequently, the prepared glass was subject to thermal treatment in two steps, the first step at 440° C. for 20 hours and the second step at 790° C. for 20 hours, and thus, crystallized glass was obtained. The crystallized glass was subject to acid treatment by immersing the crystallized glass in 5N nitric acid at 60° C. for 12 hours, and subsequently, particles were collected by filtering to obtain LATP crystal particles of Comparative Example 3.

Comparative Example 4

By using $LiPO_3$, $Al(PO_3)_3$, $Zn(PO_3)_2$, $TiO_2$, and ZnO as materials, glass composed, in molar ratio, of 1.2 of $Li_2O$, 0.2 of $Al_2O_3$, 3.6 of $TiO_2$, 8 of $P_2O_5$, and 12 of ZnO was prepared. That is to say, glass according to the above embodiment in which x=0.2, y=5, and ZnO was 2.4y in molar ratio was prepared. Although the prepared glass was subject to thermal treatment at a melting point or less, no crystal was precipitated.

Comparative Example 5

By using $LiPO_3$, $Al(PO_3)_3$, $Zn(PO_3)_2$, $TiP_2O_7$, and $TiO_2$ as materials, a melt composed, in molar ratio, of 1.1 of $Li_2O$, 0.1 of $Al_2O_3$, 3.8 of $TiO_2$, 3.5 of $P_2O_5$, and 1 of ZnO was prepared. Although granulated and rapidly cooled, the prepared melt was not vitrified. That is to say, with the molar ratio of x=0.1, y=0.5, and ZnO was 2y in the above embodiment, glass was not prepared.

<X-Ray Diffraction Spectra of Crystallized Glass>

Figure 2:
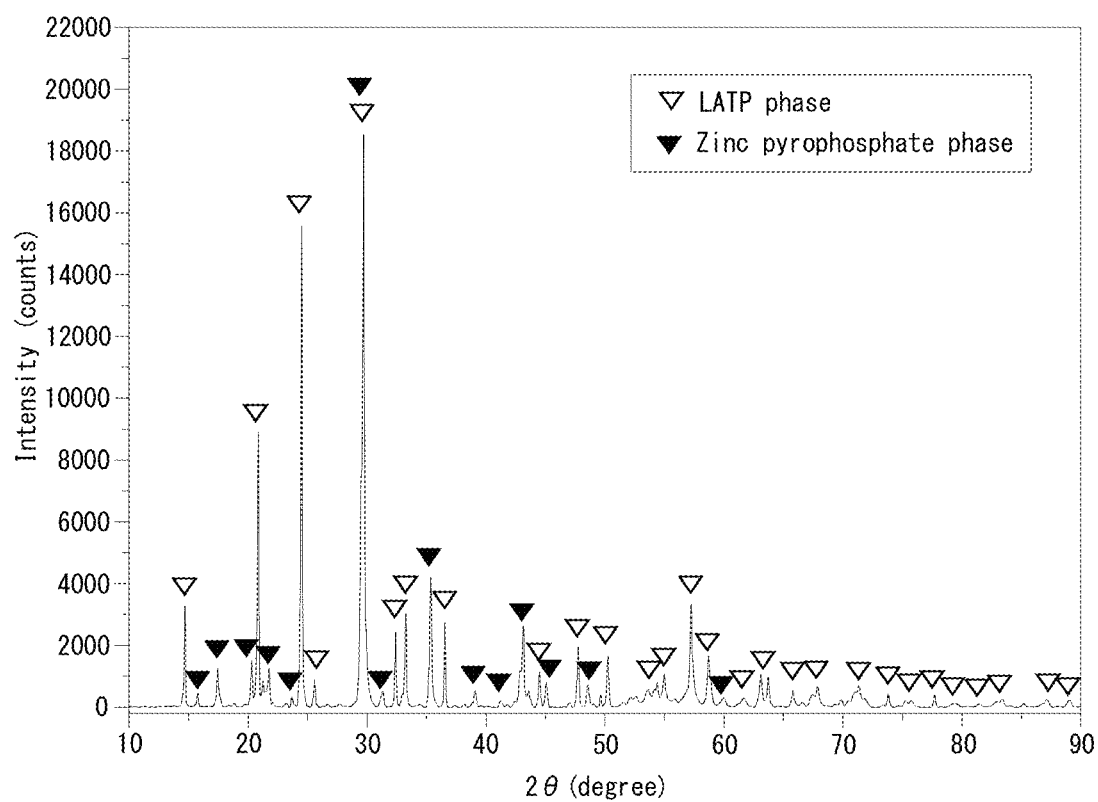
FIG. 2 illustrates an X-ray diffraction pattern of crystallized glass in a process of preparing a LATP crystal particle of Example 2.
Figure 3:
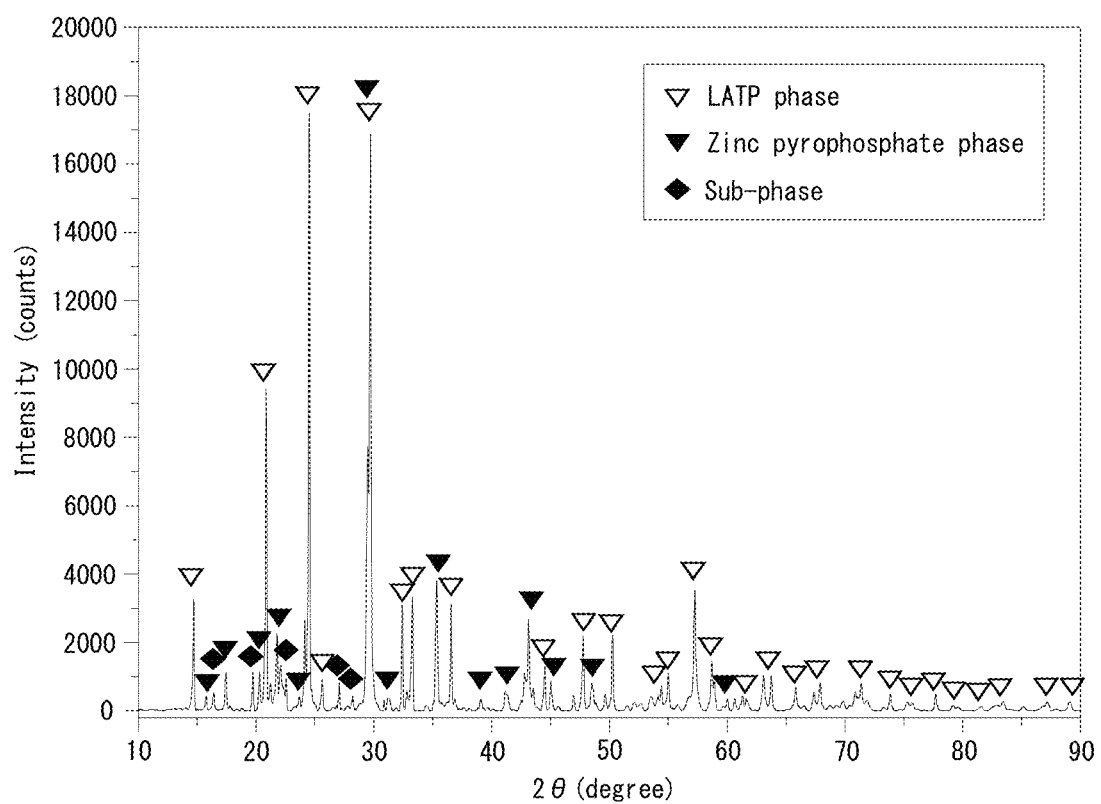
FIG. 3 illustrates an X-ray diffraction pattern of crystallized glass in a process of preparing a LATP crystal particle of Example 3.
Figure 4:
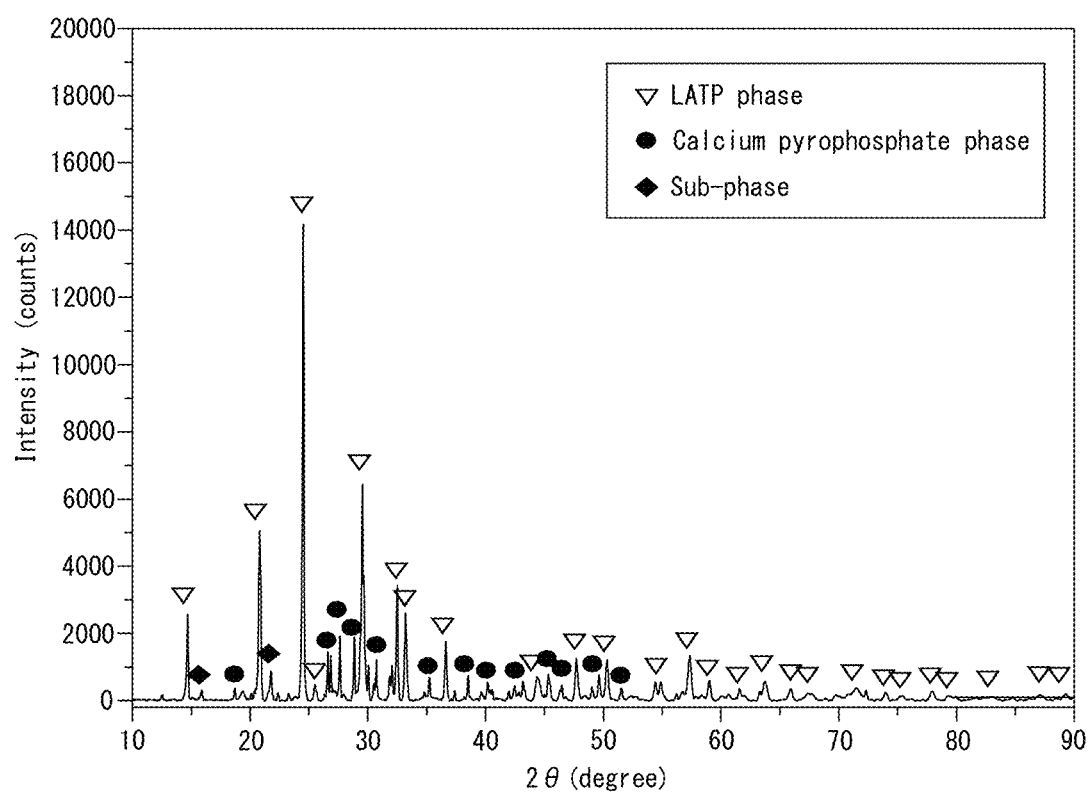
FIG. 4 illustrates an X-ray diffraction pattern of crystallized glass in a process of preparing a LATP crystal particle of Comparative Example 1.
Figure 5:
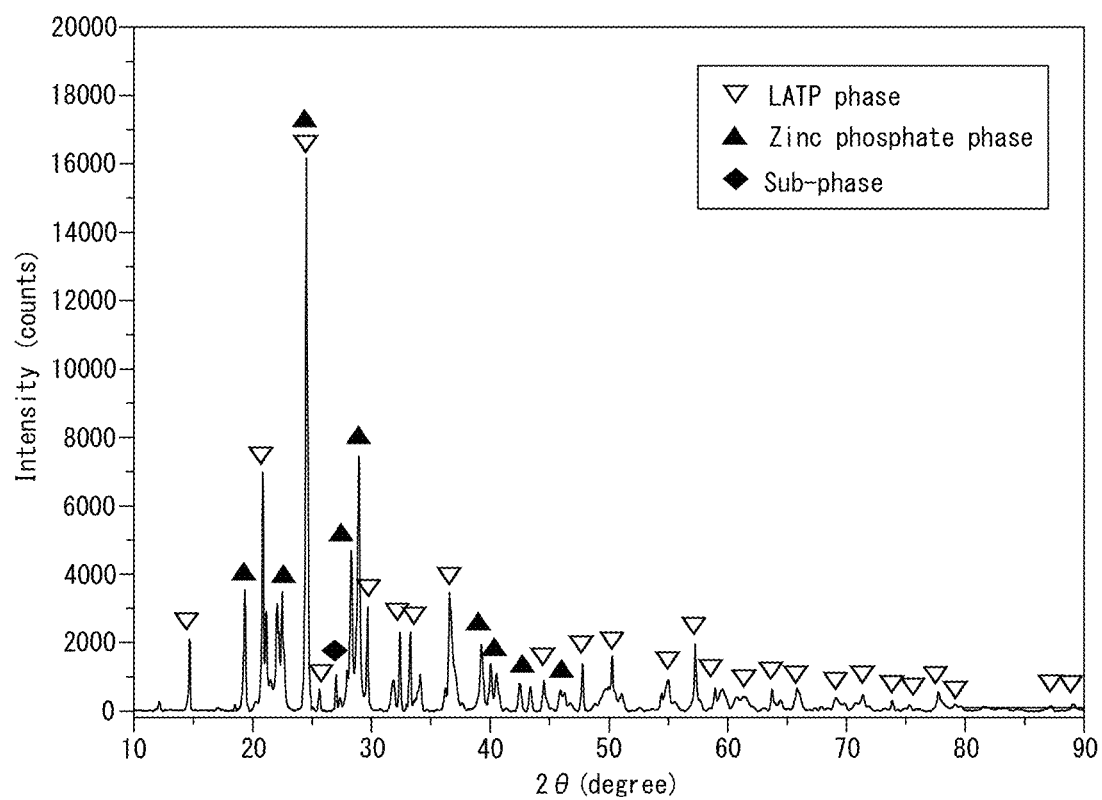
FIG. 5 illustrates an X-ray diffraction pattern of crystallized glass in a process of preparing a LATP crystal particle of Comparative Example 2.
Figure 6:
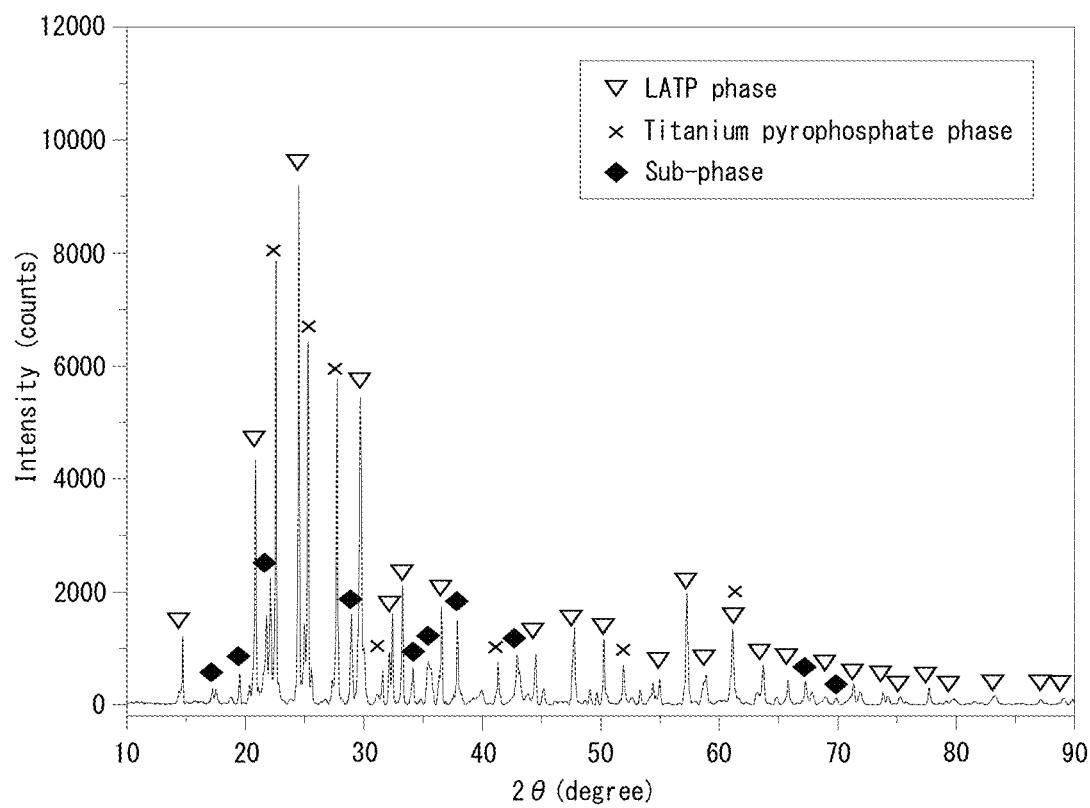
FIG. 6 illustrates an X-ray diffraction pattern of crystallized glass in a process of preparing a LATP crystal particle of Comparative Example 3.

By using an X-ray diffractometer Ultima IV (manufactured by Rigaku Co., Ltd.), X-ray diffraction spectra of crystallized glass in the process of preparing the LATP crystal particles of Examples 1 to 3 and Comparative Examples 1 to 3 were measured. FIGS. 1 to 3 and FIGS. 4 to 6 respectively illustrate the X-ray diffraction spectra of Examples 1 to 3 and Comparative Examples 1 to 3. As illustrated in FIGS. 1 and 2, it has been found that LATP crystals and zinc pyrophosphate crystals are precipitated in Examples 1 and 2. As illustrated in FIG. 3, it has been found that LATP crystals, zinc pyrophosphate crystals, and partially, sub-phases are precipitated in Example 3. As illustrated in FIG. 4, it has been found that LATP crystals, calcium phosphate crystals, and sub-phases are precipitated in Comparative Example 1. As illustrated in FIG. 5, it has been found that LATP crystals, zinc phosphate crystals, and sub-phases are precipitated in Comparative Example 2. As illustrated in FIG. 6, it has been found that LATP crystals, titanium pyrophosphate crystals, and sub-phases are precipitated in Comparative Example 3.

<X-Ray Diffraction Spectra of LATP Crystal Particles>

Figure 7:
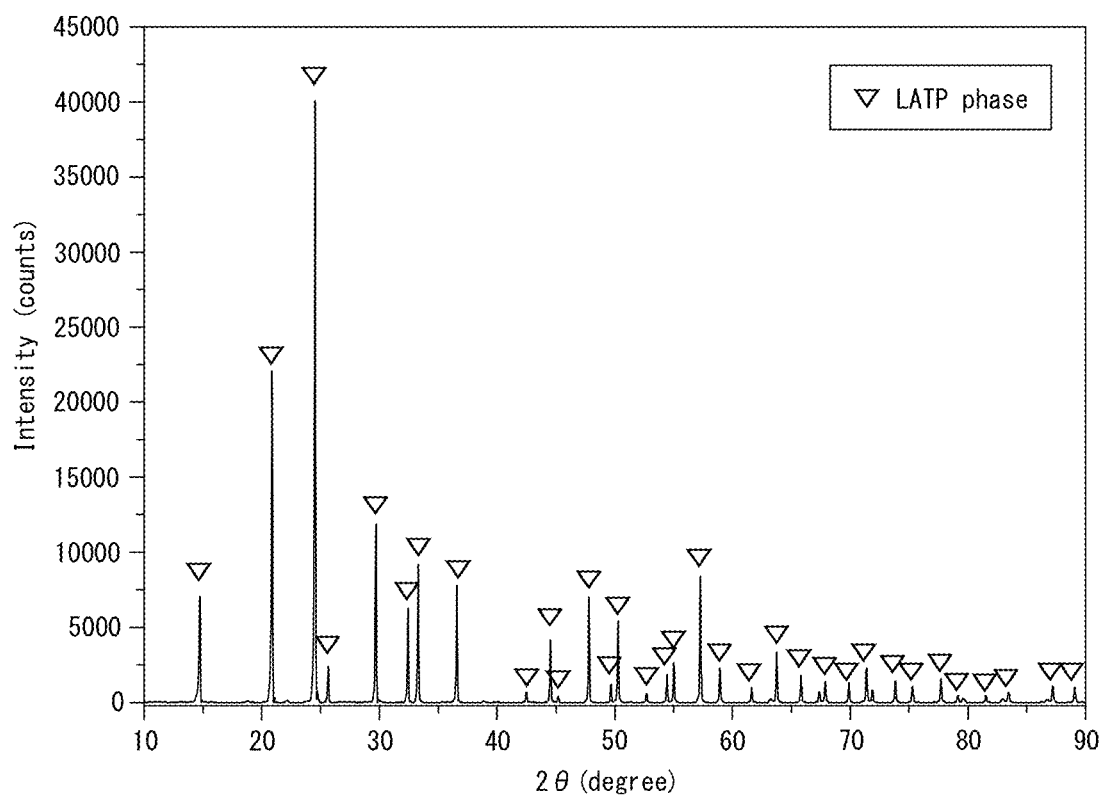
FIG. 7 illustrates an X-ray diffraction pattern of a LATP crystal particle of Example 1.
Figure 8:
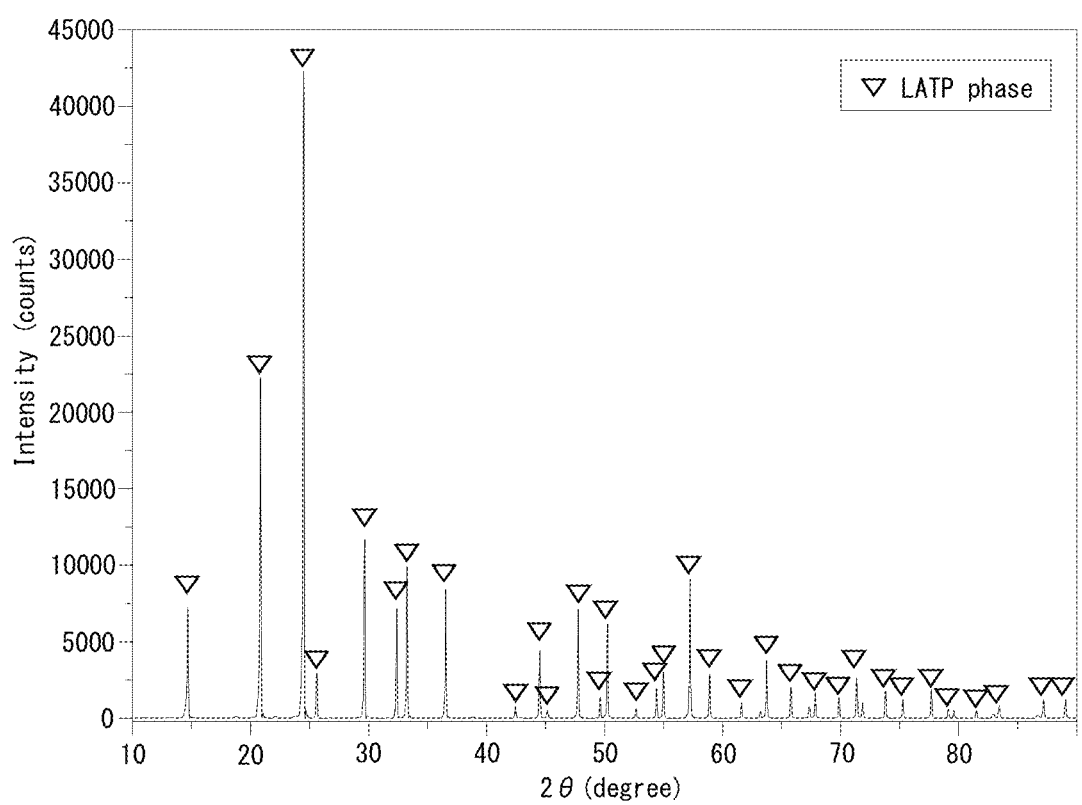
FIG. 8 illustrates an X-ray diffraction pattern of a LATP crystal particle of Example 2.
Figure 9:
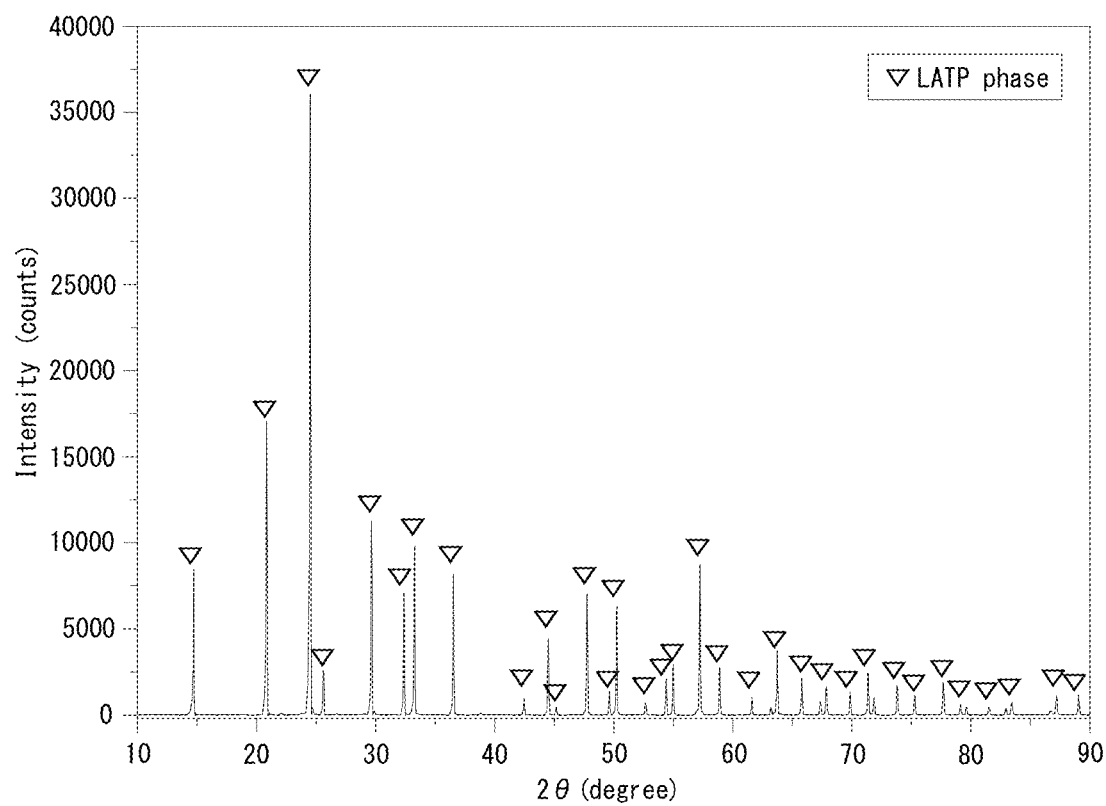
FIG. 9 illustrates an X-ray diffraction pattern of a LATP crystal particle of Example 3.
Figure 10:
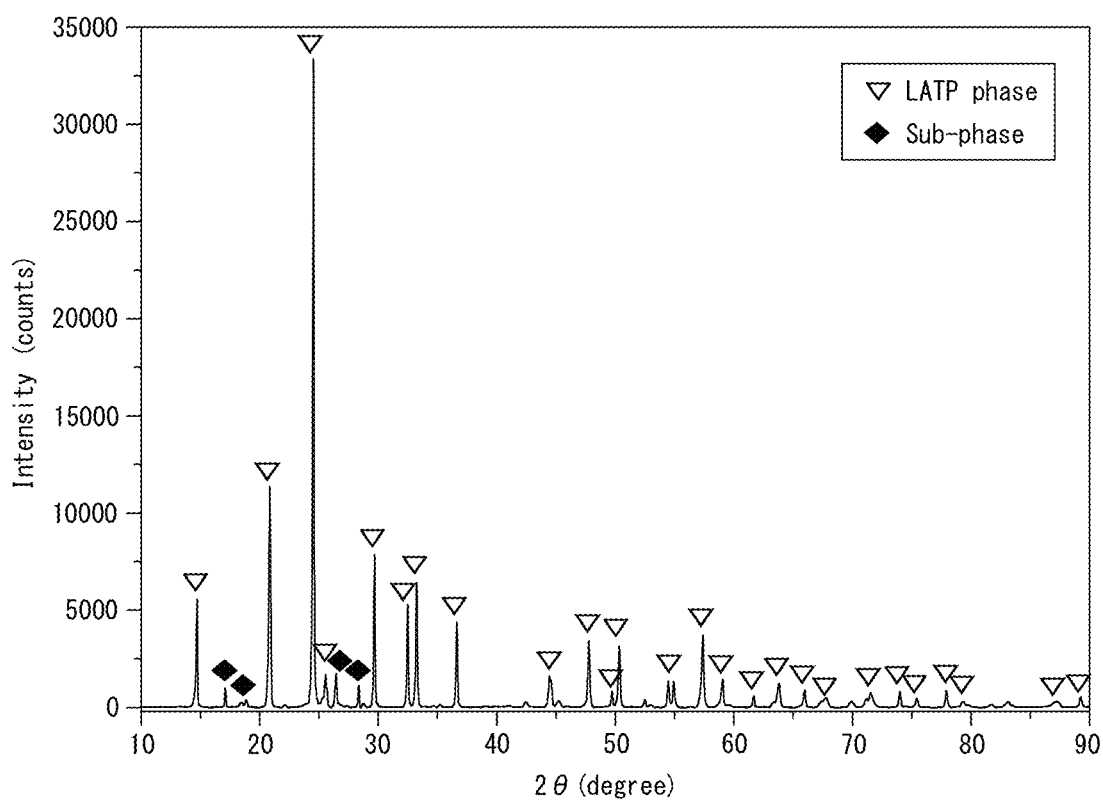
FIG. 10 illustrates an X-ray diffraction pattern of a LATP crystal particle of Comparative Example 1.
Figure 11:
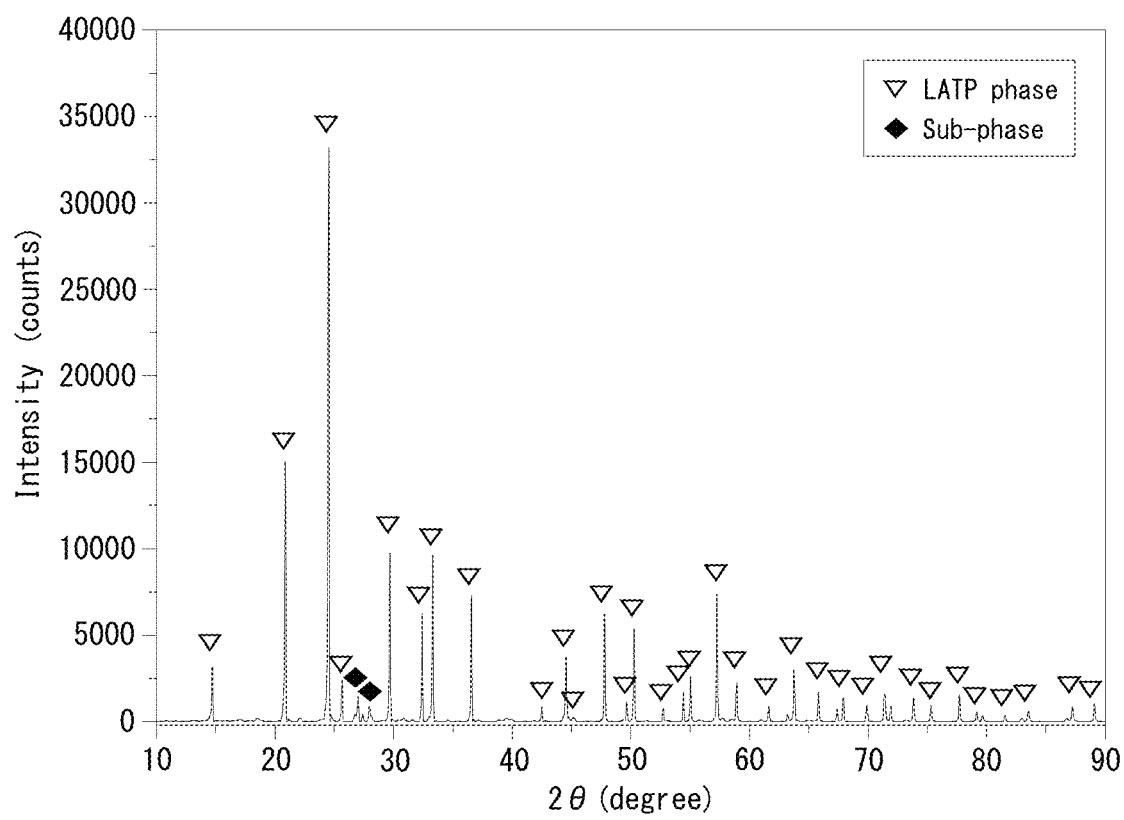
FIG. 11 illustrates an X-ray diffraction pattern of a LATP crystal particle of Comparative Example 2.
Figure 12:
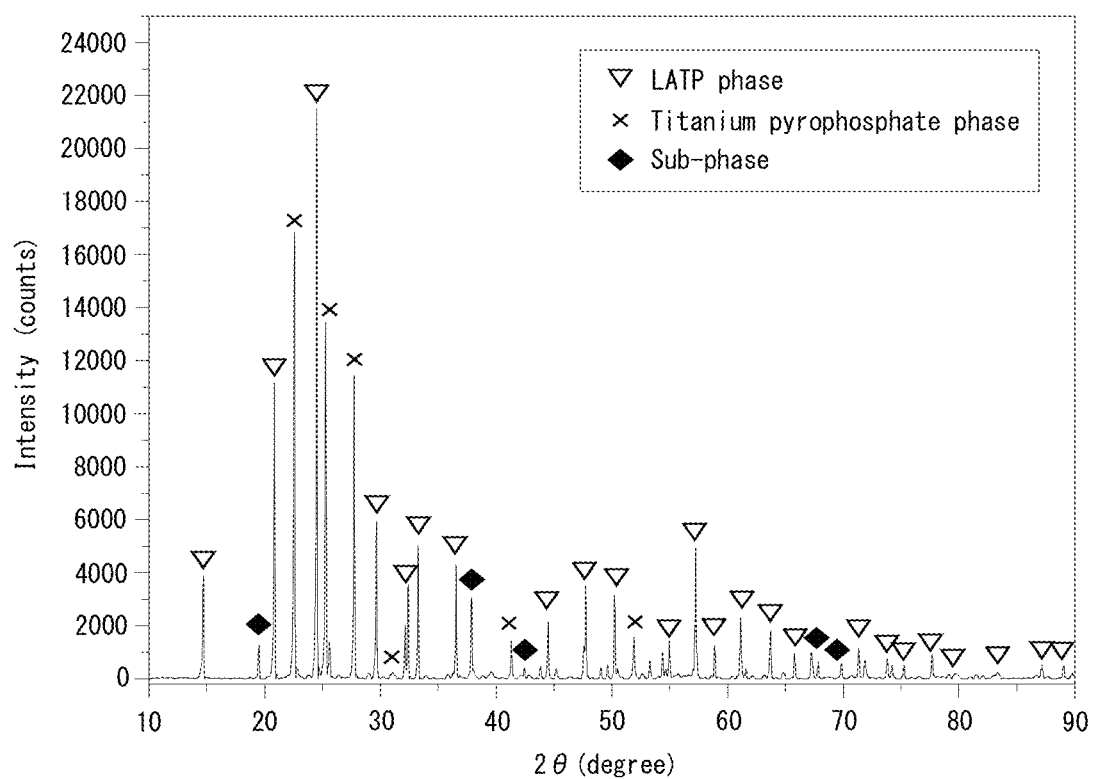
FIG. 12 illustrates an X-ray diffraction pattern of a LATP crystal particle of Comparative Example 3.

By using the X-ray diffractometer Ultima IV (manufactured by Rigaku Co., Ltd.), X-ray diffraction spectra of LATP crystal particles of Examples 1 to 3 and Comparative Examples 1 to 3 were measured. FIGS. 7 to 9 and FIGS. 10 to 12 respectively illustrate the X-ray diffraction spectra of Examples 1 to 3 and Comparative Examples 1 to 3. As illustrated in FIGS. 7 to 9, it has been found that the LATP crystal particles of Examples 1 to 3 are single-phase LATP crystals. As illustrated in FIGS. 10 and 11, it has been found that sub-phase peaks are observed in the LATP crystal particles of Comparative Examples 1 and 2 and that these LATP crystal particles are not single-phase LATP crystals. As illustrated in FIG. 12, it has been found that a titanium pyrophosphate peak and a sub-phase peak are observed in the LATP crystal particles of Comparative Example 3 and that these LATP crystal particles are not single-phase LATP crystals.

<Backscattered Electron Images of LATP Crystal Particles>

Figure 13:
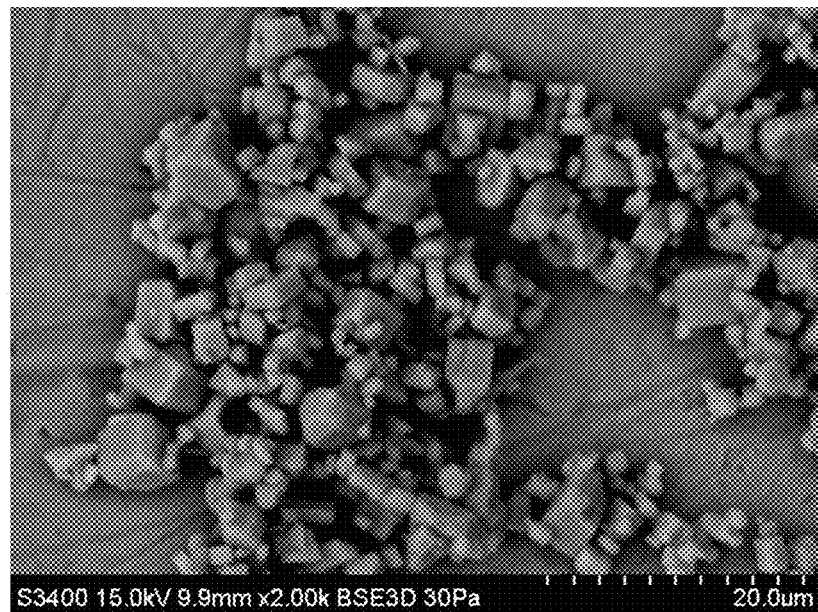
FIG. 13 illustrates a backscattered electron image of a LATP crystal particle of Example 1.
Figure 14:
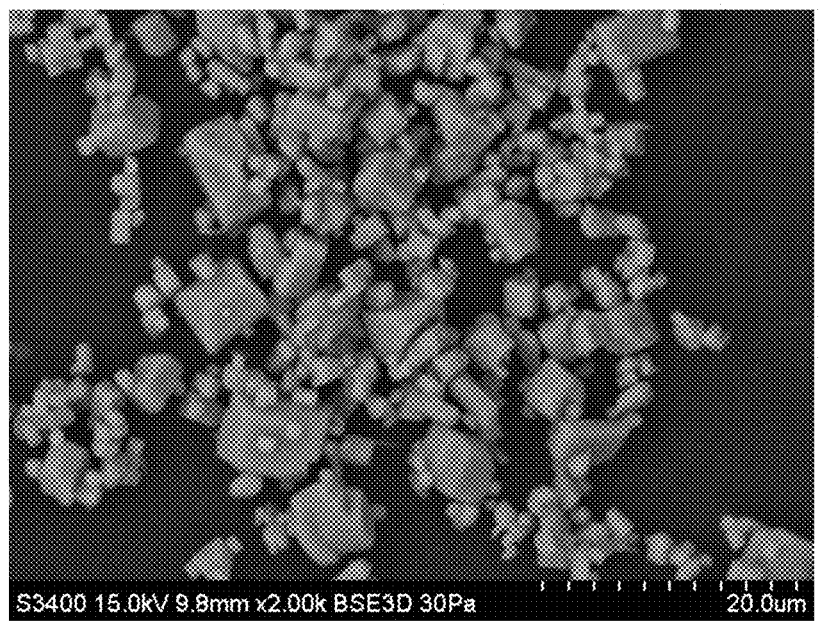
FIG. 14 illustrates a backscattered electron image of a LATP crystal particle of Example 2.
Figure 15:
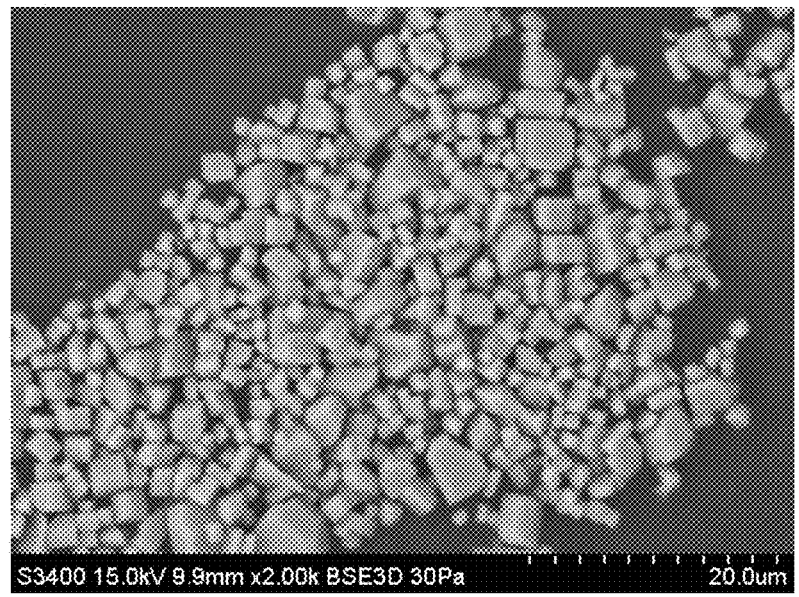
FIG. 15 illustrates a backscattered electron image of a LATP crystal particle of Example 3.
Figure 16:
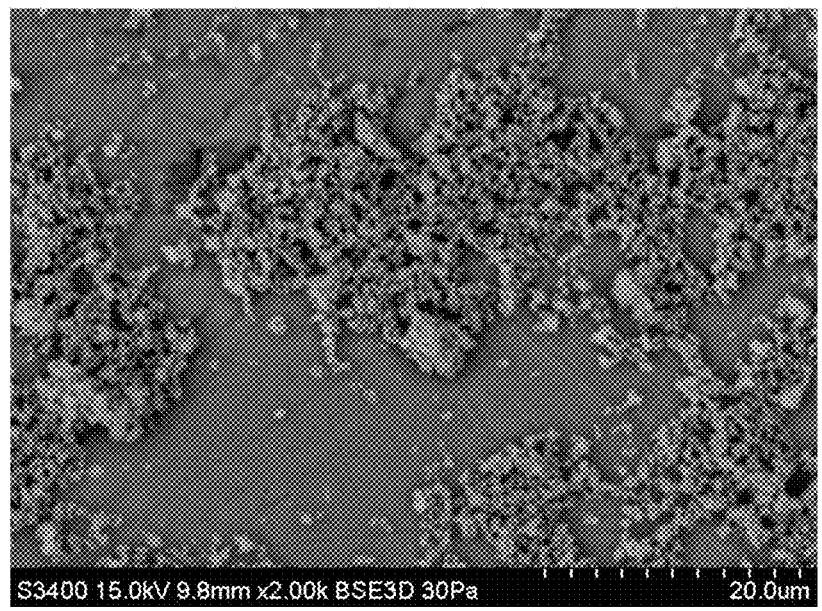
FIG. 16 illustrates a backscattered electron image of a LATP crystal particle of Comparative Example 1.
Figure 17:
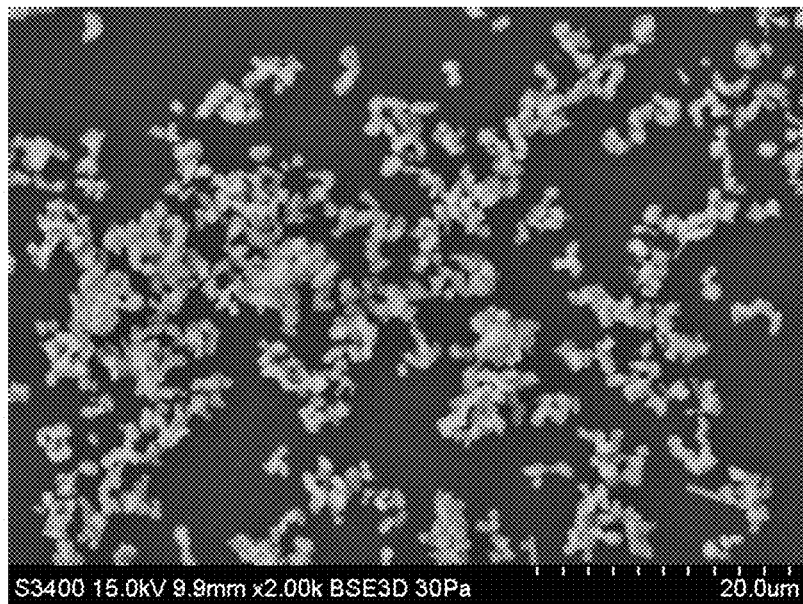
FIG. 17 illustrates a backscattered electron image of a LATP crystal particle of Comparative Example 2.
Figure 18:
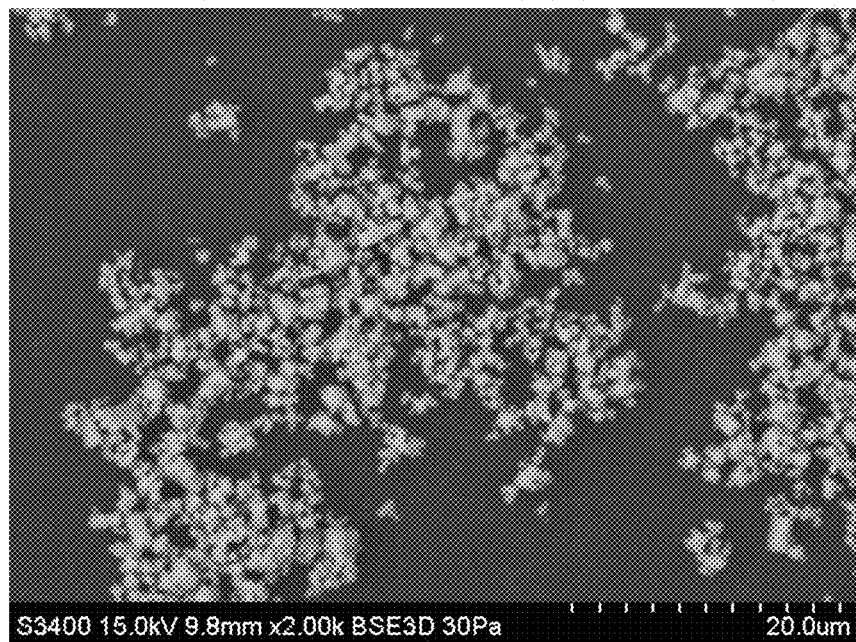
FIG. 18 illustrates a backscattered electron image of a LATP crystal particle of Comparative Example 3.

By using a scanning electron microscope S-3400N (manufactured by Hitachi High Technologies Co., Ltd.), backscattered electron images of the LATP crystal particles of Examples 1 to 3 and Comparative Examples 1 to 3 were studied. FIGS. 13 to 15 and FIGS. 16 to 18 respectively illustrate the backscattered electron images of Examples 1 to 3 and Comparative Examples 1 to 3. As illustrated in FIGS. 13 to 15, the LATP crystal particles of Examples 1 to 3 have a quadrangular prism-like shape having high crystallinity, with no agglomeration observed. As illustrated in FIG. 16, the LATP crystal particles of Comparative Example 1 have a shape having no sharp edges and having low crystallinity, with partial agglomeration observed. As illustrated in FIG. 17, the LATP crystal particles of Comparative Example 2 are observed to have a shape having no sharp edges and having low crystallinity. As illustrated in FIG. 18, the LATP crystal particles of Comparative Example 3 are generally observed to have a shape having no sharp edges and having low crystallinity, although partially observed to have a shape having high crystallinity.

<EDS Spectra of LATP Crystal Particles>

Figure 19:
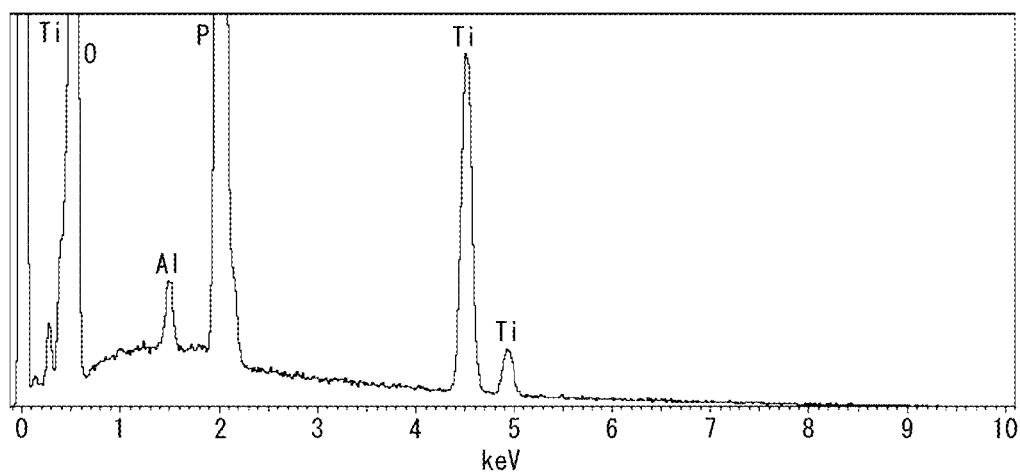
FIG. 19 illustrates an EDS spectrum of a LATP crystal particle of Example 1.
Figure 20:
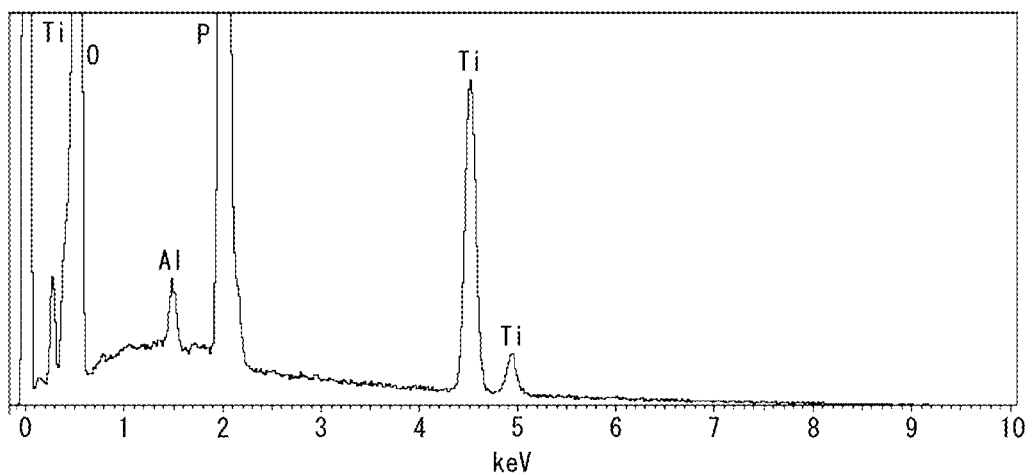
FIG. 20 illustrates an EDS spectrum of a LATP crystal particle of Example 2.
Figure 21:
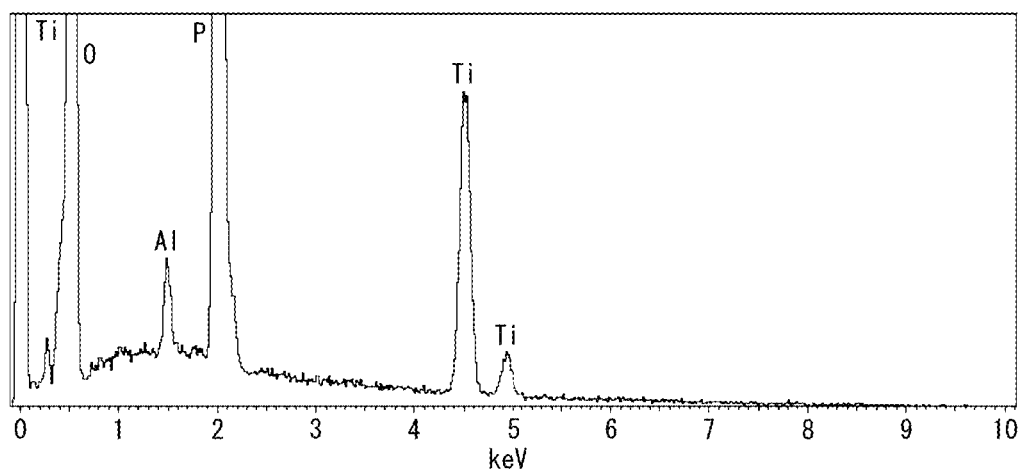
FIG. 21 illustrates an EDS spectrum of a LATP crystal particle of Example 3.
Figure 22:
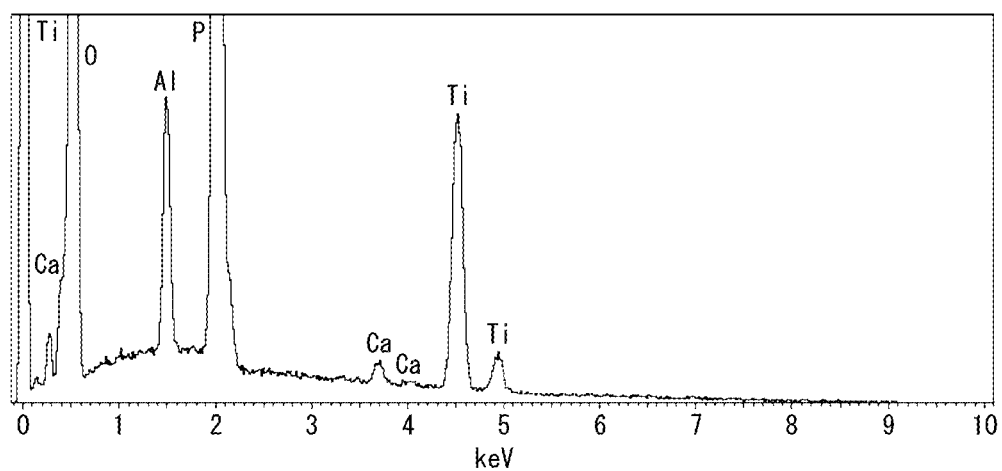
FIG. 22 illustrates an EDS spectrum of a LATP crystal particle of Comparative Example 1.
Figure 23:
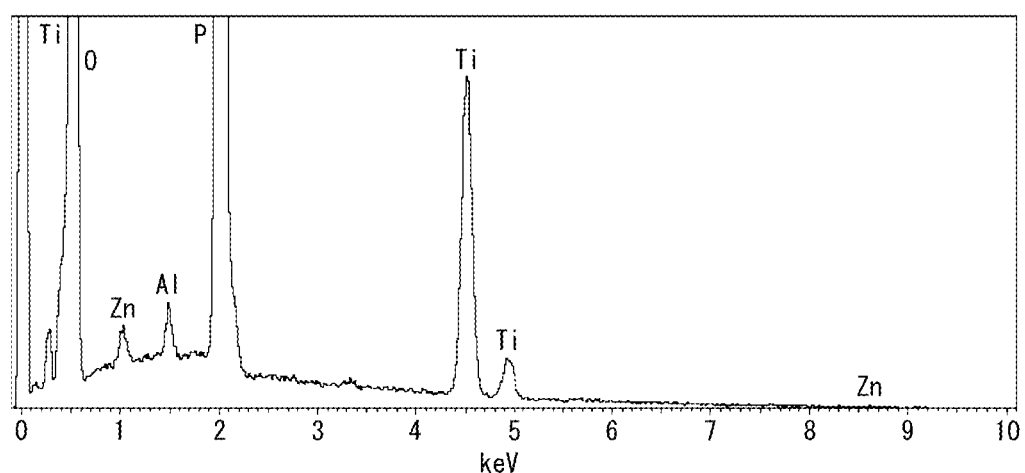
FIG. 23 illustrates an EDS spectrum of a LATP crystal particle of Comparative Example 2.
Figure 24:
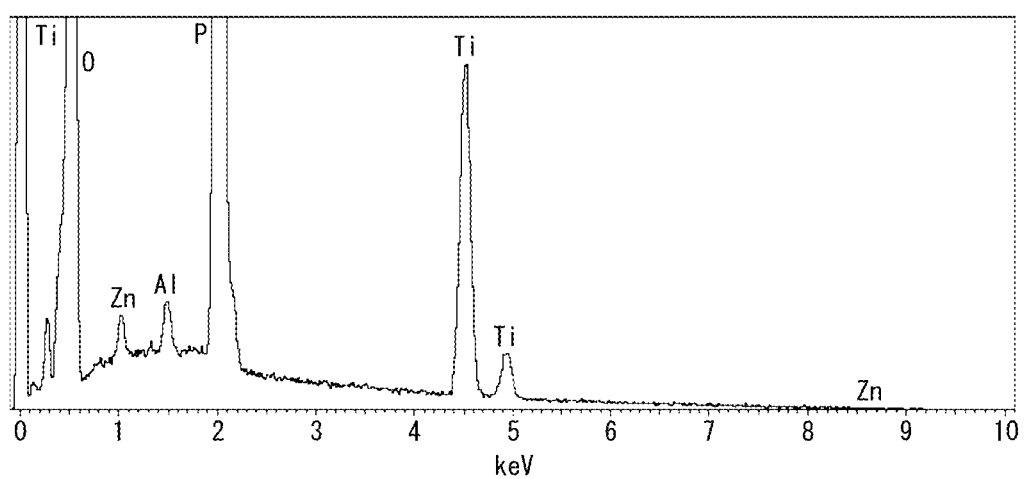
FIG. 24 illustrates an EDS spectrum of a LATP crystal particle of Comparative Example 3.

By using an energy-dispersive X-ray analysis device INCA Energy manufactured by Oxford Instruments Plc.), EDS spectra of the LATP crystal particles of Examples 1 to 3 and Comparative Examples 1 to 3 were measured. FIGS. 19 to 21 and FIGS. 22 to 24 respectively illustrate the EDS spectra of Examples 1 to 3 and Comparative Examples 1 to 3. As illustrated in FIGS. 19 to 21, in the LATP crystal particles of Examples 1 to 3, an element other than the elements constituting the LATP crystals is not detected. As illustrated in FIG. 22, in the LATP crystal particles of Comparative Example 1, in addition to the elements constituting the LATP crystals, Ca is detected. As illustrated in FIGS. 23 and 24, in the LATP crystal particles of Comparative Examples 2 and 3, in addition to the elements constituting the LATP crystals, Zn is detected.

Although the present disclosure has been described based on the drawings and the embodiment, it is to be noted that a variety of changes and modifications may be made by a person skilled in the art. It is therefore to be noted that these changes and modifications are included in the scope of the present disclosure.

The invention claimed is:

1. A method of producing a crystal of lithium-based composite oxide represented by Formula (I) shown below $$Li_{1+x}Al_xTi_{2-x}(PO_4)_3 (0 \le x \le 1.0) \quad (I)$$

the method comprising:
  mixing and heating glass materials to produce melt;
  rapidly cooling the melt to obtain a granulated glass containing,
  in molar ratio,
  1+x of $Li_2O$, where $0 \le x \le 1$,
  x of $Al_2O_3$,
  4−2x of $TiO_2$,
  3+y of $P_2O_5$, where $1 \le y \le 4$, and
  more than y and less than 3y of ZnO;
  thermally treating the granulated glass to obtain a crystallized glass which includes a crystal of lithium-based composite oxide and a crystal of zinc pyrophosphate;
  immersing the crystallized glass in an acid solution to elute a substance which includes the crystal of zinc pyrophosphate and is other than the crystal of lithium-based composite oxide, and
  separating the crystal of lithium-based composite oxide from the acid solution containing the eluted substance.

2. The method according to claim 1, wherein
  the molar ratio of ZnO in the glass is more than y and 2y or less.

3. The method according to claim 1, wherein the crystal of lithium-based composite oxide separated from the acid solution is a single-phase crystal of lithium-based composite oxide.

* * * * *